United States Patent
Berman

(10) Patent No.: US 11,639,814 B2
(45) Date of Patent: May 2, 2023

(54) METHOD OF DEPLOYING A HEAT EXCHANGER PIPE

(71) Applicant: Ari Peter Berman, Lexington, MA (US)

(72) Inventor: Ari Peter Berman, Lexington, MA (US)

(73) Assignee: Ari Peter Berman, Lexington, MA (US)

( * ) Notice: Subject to any disclaimer, the term of this patent is extended or adjusted under 35 U.S.C. 154(b) by 0 days.

(21) Appl. No.: 17/665,694

(22) Filed: Feb. 7, 2022

(65) Prior Publication Data
US 2022/0178589 A1    Jun. 9, 2022

Related U.S. Application Data

(62) Division of application No. 16/189,378, filed on Nov. 13, 2018, now Pat. No. 11,274,856.

(51) Int. Cl.
*F24T 10/15* (2018.01)
*F28D 20/00* (2006.01)
(Continued)

(52) U.S. Cl.
CPC .............. *F24T 10/15* (2018.05); *B21D 53/02* (2013.01); *E21B 7/00* (2013.01); *E21B 7/20* (2013.01);
(Continued)

(58) Field of Classification Search
CPC . F24T 10/15; F24T 10/13; F24T 50/00; F24T 2010/53; F24T 2010/56;
(Continued)

(56) References Cited

U.S. PATENT DOCUMENTS

| 4,402,372 A | * | 9/1983 | Cherrington | ............ E21B 7/046 |
| | | | | 175/325.2 |
| RE32,267 E | * | 10/1986 | Cherrington | .............. E21B 7/20 |
| | | | | 175/391 |

(Continued)

FOREIGN PATENT DOCUMENTS

| CN | 107208464 A | * | 9/2017 | ............. E21B 19/00 |
| DE | 102013016955 A1 | * | 10/2014 | ............. E21B 7/046 |

(Continued)

OTHER PUBLICATIONS

Translations (or English abstract) of each of the foreign patent documents above.*

*Primary Examiner* — Mickey H France
(74) *Attorney, Agent, or Firm* — Kirk Teska

(57) ABSTRACT

A new system for and a method of deploying a heat exchanger pipe. A bore hole is drilled from an access ditch location to a terminal ditch location using a piloted drill head powered via an umbilical attached to the piloted drill head. A casing is attached to the piloted drill head and disposed about the umbilical into the bore hole from the access ditch location to the terminal ditch location. At the terminal ditch location, the piloted drill head is removed from the casing and the umbilical and a heat exchanger pipe is attached to the umbilical. The umbilical is withdrawn from within the casing deployed in the bore hole to pull the heat exchanger pipe into the casing. The casing is then withdrawn from the bore hole leaving the heat exchanger pipe in the bore hole.

10 Claims, 16 Drawing Sheets

(51) Int. Cl.
*F24T 50/00* (2018.01)
*F24T 10/13* (2018.01)
*E21B 7/00* (2006.01)
*B21D 53/02* (2006.01)
*E21B 7/20* (2006.01)
*F25B 30/06* (2006.01)
*F24T 10/00* (2018.01)

(52) U.S. Cl.
CPC .............. *F24T 10/13* (2018.05); *F24T 50/00* (2018.05); *F25B 30/06* (2013.01); *F28D 20/0052* (2013.01); *E21B 7/001* (2013.01); *F24T 2010/53* (2018.05); *F24T 2010/56* (2018.05); *F25B 2313/002* (2013.01); *Y02E 10/10* (2013.01)

(58) Field of Classification Search
CPC ... B21D 53/02; E21B 7/00; E21B 7/20; E21B 7/001; E21B 7/046; F25B 30/06; F25B 2313/002; F28D 20/0052; Y02E 10/10
USPC ......... 62/260; 60/641.2; 29/890.032; 165/45
See application file for complete search history.

(56) References Cited

U.S. PATENT DOCUMENTS

| | | | | |
|---|---|---|---|---|
| 4,784,230 A | * | 11/1988 | Cherrington | ............ E21B 7/065 |
| | | | | 175/406 |
| 4,785,885 A | * | 11/1988 | Cherrington | .............. E21B 7/20 |
| | | | | 175/325.2 |
| 4,927,294 A | * | 5/1990 | Magnani | .................. E02F 5/145 |
| | | | | 405/175 |
| 5,833,015 A | * | 11/1998 | Hesse | ....................... H02G 1/08 |
| | | | | 73/152.48 |
| 6,422,318 B1 | * | 7/2002 | Rider | ...................... E21B 43/00 |
| | | | | 405/184 |
| 7,544,036 B1 | * | 6/2009 | Randall | ..................... E21B 7/20 |
| | | | | 414/746.4 |
| 8,281,861 B2 | * | 10/2012 | Nguyen | ................... H05B 3/48 |
| | | | | 166/57 |
| 8,496,238 B1 | * | 7/2013 | Orgeron | ................ E21B 19/155 |
| | | | | 29/244 |
| 9,500,049 B1 | * | 11/2016 | Orgeron | ..................... E21B 19/087 |
| 9,541,309 B2 | * | 1/2017 | Colwell | .................. F24T 10/30 |
| 10,180,031 B2 | * | 1/2019 | Engle | ...................... E21B 7/046 |
| 2008/0247826 A1 | * | 10/2008 | Kogler | .................... E21B 7/265 |
| | | | | 405/184 |
| 2009/0236146 A1 | * | 9/2009 | Pierz | ......................... E21B 7/20 |
| | | | | 175/162 |
| 2012/0080163 A1 | * | 4/2012 | Hoffman | .................. E21B 7/04 |
| | | | | 165/45 |
| 2012/0145463 A1 | * | 6/2012 | Lee | ........................ E21B 43/305 |
| | | | | 175/79 |
| 2012/0312547 A1 | * | 12/2012 | Miller | ..................... E21B 34/14 |
| | | | | 166/373 |
| 2013/0008718 A1 | * | 1/2013 | Nguyen | ................. E21B 21/12 |
| | | | | 175/122 |
| 2017/0356587 A1 | * | 12/2017 | Burbridge | .................. F16L 1/11 |
| 2018/0163475 A1 | * | 6/2018 | Barbera | .................... E21B 7/20 |
| 2018/0209261 A1 | * | 7/2018 | Lubrecht | ................. E21B 10/64 |
| 2018/0269664 A1 | * | 9/2018 | Peters | ....................... E21B 7/28 |
| 2018/0371841 A1 | * | 12/2018 | Barbera | ..................... E21B 7/201 |
| 2019/0211628 A1 | * | 7/2019 | Halderman | ............... E21B 7/20 |
| 2020/0032598 A1 | * | 1/2020 | Kysely | ...................... E21B 7/28 |

FOREIGN PATENT DOCUMENTS

| | | | | |
|---|---|---|---|---|
| FR | 2431004 A | * | 3/1980 | ............... E02D 7/28 |
| JP | 2008156995 A | * | 7/2008 | |
| JP | 2012007364 A | * | 1/2012 | |
| NO | 150173 B | * | 5/1984 | ............... E21B 7/28 |

* cited by examiner

METHOD OF DEPLOYING A HEAT EXCHANGER PIPE

RELATED APPLICATIONS

This application claims benefit of and priority to U.S. patent application Ser. No. 16/189,378 filed Nov. 13, 2018 under 35 U.S.C. §§ 119, 120, 363, 365, and 37 C.F.R. § 1.55 and § 1.78, which is incorporated herein by this reference, and U.S. Provisional Application Ser. No. 62/587,322 filed Nov. 16, 2017, under 35 U.S.C. §§ 119, 120, 363, 365, and 37 C.F.R. § 1.55 and § 1.78, which is also incorporated herein by this reference.

FIELD OF THE INVENTION

This invention relates to the installation of ground coupled heat exchanger systems and related mechanisms.

BACKGROUND OF THE INVENTION

Ground coupled heat exchanger systems (also called geothermal heat pumps or ground source heat pumps) are used to save energy by exploiting the fact that the temperature underground remains fairly constant year-round. Heat exchanger pipes are typically laid horizontally underground and connected, for example, to a heat-pump-based heating ventilation and air-conditioning (HVAC) subsystem of a house.

Two installation techniques are in common use. In the first trenches are dug in the ground and the heat exchanger pipes are laid horizontally in the trenches. The second common technique is to drill one or more vertical wells, then a heat exchanger pipe loop is installed in each of these well holes. Both techniques add significantly to the cost of the system installation and disrupts the homeowners landscaping.

In U.S. Pat. No. 8,963,113 (incorporated herein by this reference), two pipes are connected to a sacrificial percussion mole used to lay the two pipes underground (a supply and a return pipe connected together via the percussion mole). The mole, however, is sacrificial in that it remains in the ground.

Another possible method is to use a drill to bore a horizontal bore hole in the earth and drag the heat exchanger pipe into the bore hole. Heat exchanger pipes, however, are usually inexpensive plastic thin walled flexible tubing ¾ to 1 inch in diameter. It was discovered that the above method often damaged the heat exchanger pipe.

SUMMARY OF THE INVENTION

Realized is a new method of deploying a heat exchanger pipe wherein a casing deployed in the bore hole protects the more fragile heat exchanger pipe as it is deployed into the bore hole.

The novel method can minimize the cost of having to dig trenches or drilling wells in the ground and minimizes the disruption of a homeowner's landscaping. The novel method also features the ability to reuse the piloted drill head to deploy additional heat exchanger pipes. The novel method also minimizes damage to the heat exchanger pipes. The novel method also allows the installation of a wide mesh of heat exchanger pipe distribution through a heat exchange field while only requiring the excavation of a few small access ditches.

In one preferred example, a piloted drill head drills a bore hole from an access ditch to a distant terminal ditch. The piloted drill head is attached to the front of a deployment pipeline, preferably via one or more steerable joints. The deployment pipeline has a protective outer casing, for example a coiled spring or a series of articulated tube segments. This casing resists compression but can bend along its long axis. An umbilical cable is deployed within this outer casing. The casing is driven forward into the ground by a casing driver that remains stationary above ground at the access ditch. This casing advances the piloted drill head as the drill continues to excavate the bore hole.

Eventually the piloted drill head emerges into the terminal ditch. The piloted drill head is then removed from the casing and the umbilical. Once the piloted drill head is separated from the casing, the piloted drill head can be reused to deploy more heat exchanger pipes making up the heat exchanger system.

Then, a heat exchanger pipe is attached to the umbilical at the terminal ditch location. The umbilical is withdrawn from the casing and out of the access ditch, so the umbilical can also be re-used. This action pulls the heat exchanger pipe into the casing which at that moment still resides in the bore hole. Finally, the casing is also withdrawn out of the bore hole, for example, by pulling it from the access ditch, leaving the heat exchanger pipe in the bore hole.

Also featured is a novel drive system to propel the casing forward or backward, a novel piloted drill head, novel steerable joints, and a novel umbilical supply cable.

Featured is a method of deploying a heat exchanger pipe. The preferred method comprises drilling a bore hole from an access ditch location to a terminal ditch location using a piloted drill head powered via an umbilical attached to the piloted drill head. A casing is attached to the piloted drill head and disposed about the umbilical. The drill head deploys the casing into the bore hole from the access ditch location to the terminal ditch location. At the terminal ditch location, the piloted drill head is removed from the casing and the umbilical. A heat exchanger pipe is then attached to the umbilical at the terminal ditch location. The umbilical is then withdrawn from within the casing deployed in the bore hole to pull the heat exchanger pipe into the casing. The casing is then withdrawn from the bore hole leaving the heat exchanger pipe in the bore hole.

One method may further include attaching a grout pipeline to the casing at the terminal ditch location before withdrawing the casing from the bore hole and deploying the grout pipeline into the bore hole adjacent the heat exchanger pipe as the casing is withdrawn from the bore hole. This method may further include withdrawing the grout pipeline from the bore hole while supplying grout into the bore hole about the heat exchanger pipe.

The method preferably includes urging bore hole cuttings out of the bore hole via the umbilical. Thus, the umbilical preferably includes a fluid channel for delivering a fluid to the piloted drill head and an evacuation channel for removing said fluid and said bore hole cuttings from the piloted drill head to the access ditch location.

Deploying the casing into the bore hole may include driving the casing into the bore hole pushing the piloted drill head towards the terminal ditch location. In one version, the casing includes a coil spring. The method may further include steering the piloted drill head. Steering the piloted drill head preferably includes employing one or more steerable joints disposed between the drill head and the casing. Steering the piloted drill head may be based on acoustically determining the location of the piloted drill head.

Also featured is a heat exchanger pipe installation system comprising a piloted drill head, an umbilical removably connected to the piloted drill head, a casing removably connected to the piloted drill head about the umbilical, and an umbilical attachment mechanism for removably connecting a heat exchanger pipe to the umbilical.

The system preferably further includes a drive subsystem for the casing including a casing drive rail located proximate an access ditch and containing the heat exchanger pipe and at least one trolley moving along the rail and configured to urge the casing towards a terminal ditch location. Preferably, the rail includes a tunnel for the casing and an access channel into the tunnel. The trolley may include a grasping device extending into the tunnel through the access channel. The grasping device is preferably configured to releasably grasp the casing in the tunnel. In one version, the rail includes at least one gear rack and the trolley includes at least one motorized pinion engaging the gear rack. The rail may include a pair of opposing side gear racks and the trolley includes at least one motorized pinion for each side gear rack. One or more motors drive pinions via a gear train.

Also featured is a method of deploying a heat exchanger pipe comprising drilling a curved bore hole from an access ditch location to a terminal ditch location using a piloted drill head powered via an umbilical attached to the piloted drill head, at the terminal ditch location, removing the piloted drill head from the umbilical, at the terminal ditch location, attaching a heat exchanger pipe to the umbilical, and at the access ditch location, withdrawing the umbilical the bore hole and pulling the heat exchanger pipe into the bore hole.

In one embodiment, the method further includes drilling a plurality of additional spaced curved bore holes from the access ditch location to the terminal ditch location and repeating the removing, attaching, and withdrawing steps to deploy a plurality of spaced heat exchanger pipes into the plurality of bore holes extending from the access ditch location to the terminal ditch location. Drilling the bore hole preferably include urging bore hole cuttings out of the bore hole via the umbilical. The umbilical may include a fluid channel for delivering a fluid to the piloted drill head and an evacuation channel for delivering said fluid and said bore hole cuttings from the piloted drill head to the access ditch location.

The method may further include steering the piloted drill head by employing one or more steerable joints disposed between the drill head and the umbilical.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1A:
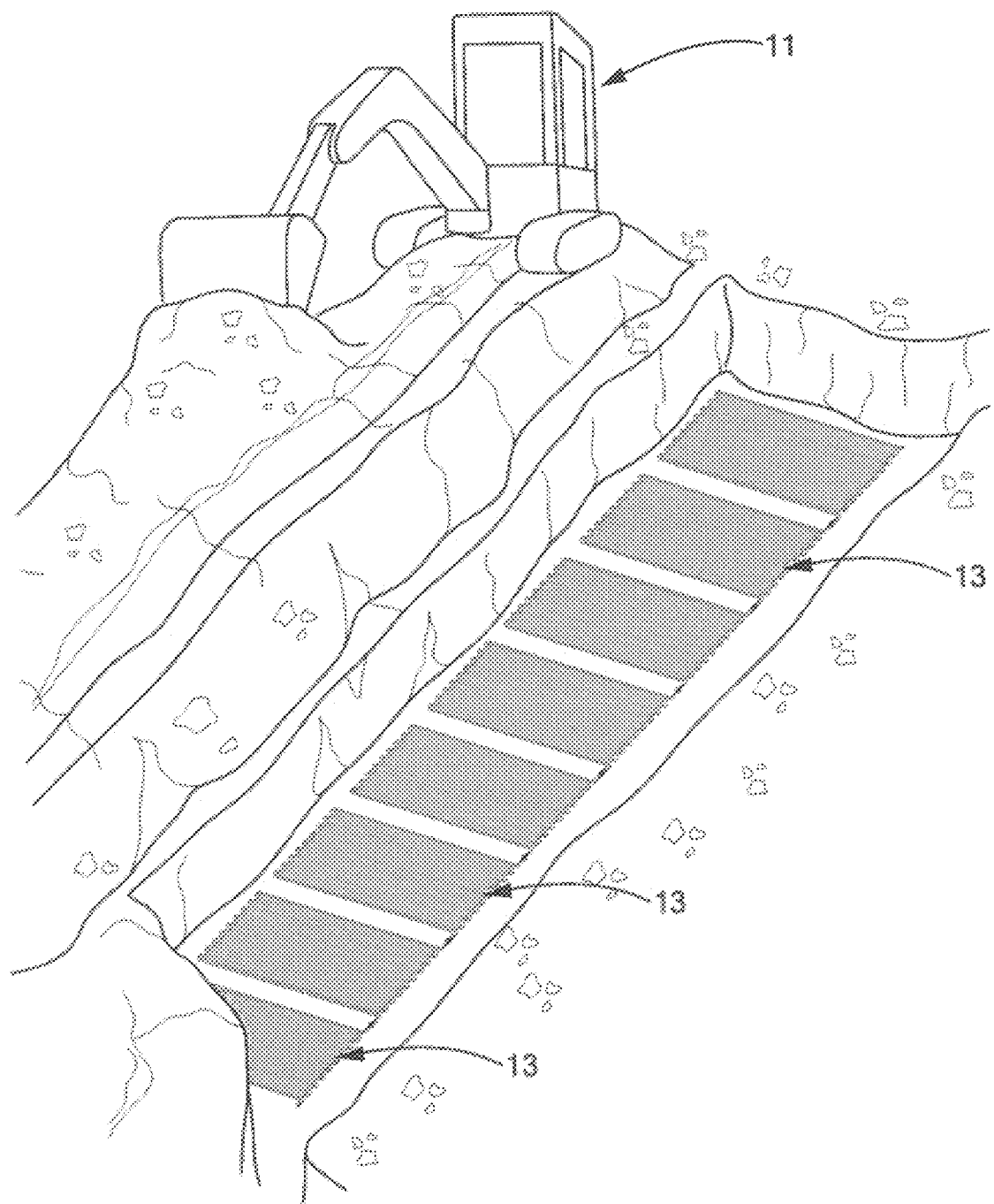
FIG. 1A is a view showing how heat exchanger pipes are laid in a trench dug in the ground by an excavator in accordance with the prior art.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1A shows how, in the prior art, heat exchanger pipes 13 are deployed underground by first digging a ditch using an excavator 11. This adds to the installation cost both directly and through the collateral expense of restoring the sites landscaping.

Figure 1B:
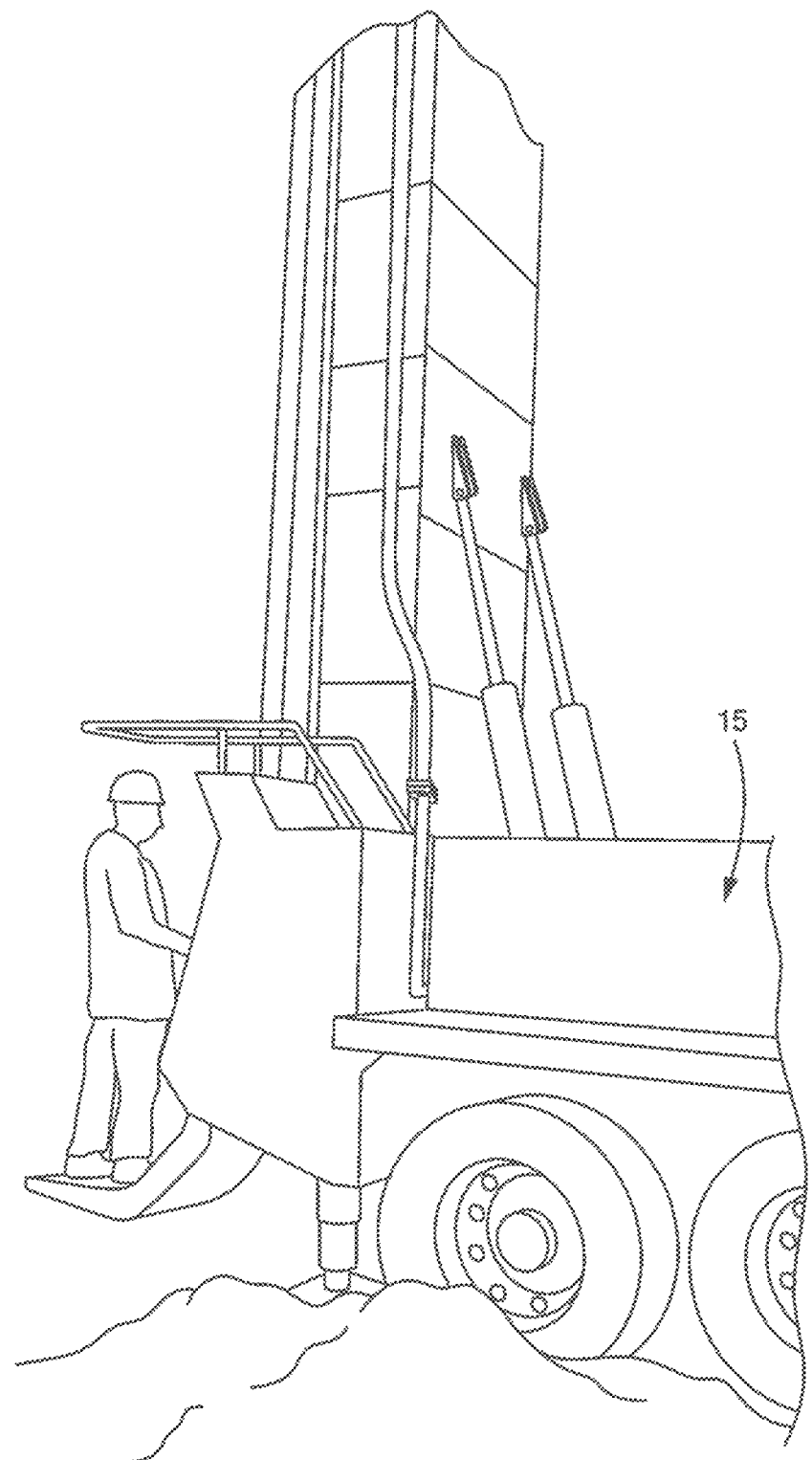
FIG. 1B is a view showing how heat exchanger pipes are installed vertically using a well drilling derrick in accordance with the prior art.

FIG. 1B showing an alternative prior art in which a conventional well drilling derrick is used to deploying a heat exchanger vertically.

Figure 2A:
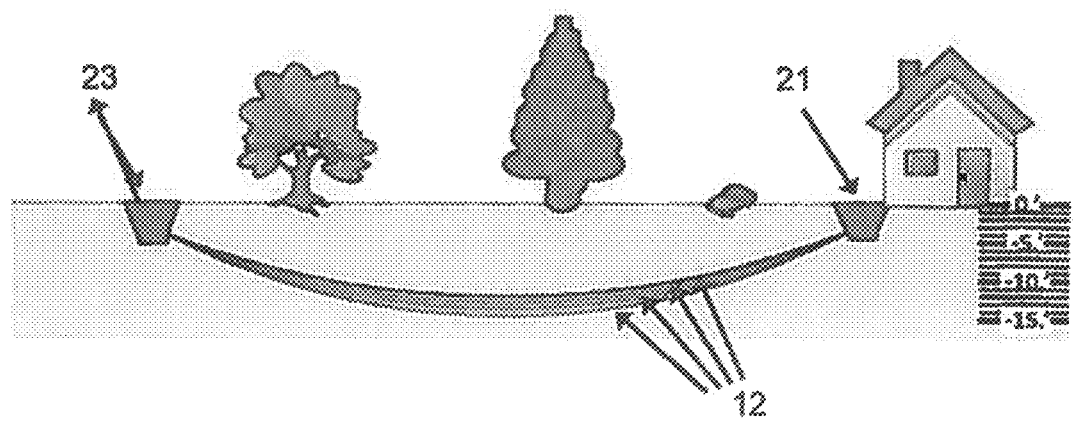
FIG. 2A is a schematic depth profile view showing one version of a mesh of heat exchanger pipes between an access ditch and a terminal ditch in accordance with aspects of the invention.
Figure 2B:
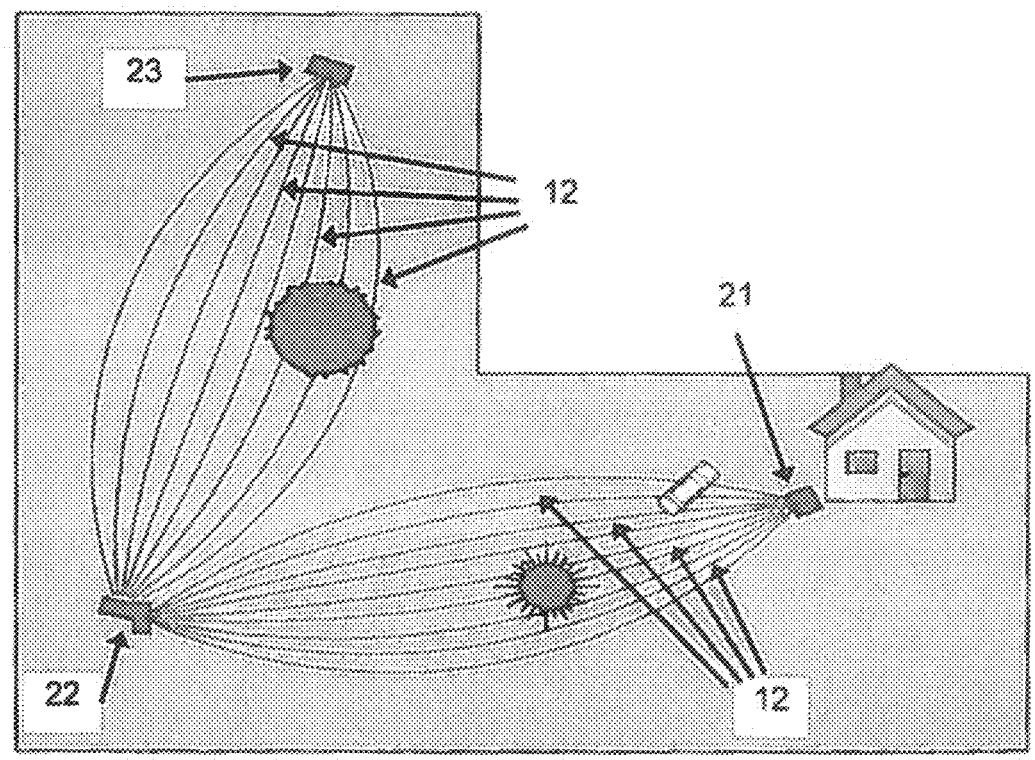
FIG. 2B is a schematic overhead view showing one version of a mesh of heat exchanger pipes deployed into the earth between an access ditch and an intermediate terminal ditch and between the intermediate terminal ditch and a final terminal ditch in accordance with aspects of the invention.

As shown in FIG. 2A, according to a new method, heat exchanger pipes are deployed underground in a mesh formation from access ditch location 21 to a terminal ditch at location 23, or as show in FIG. 2B from an access ditch 21 to an intermediate ditch location 22 and, in one option, from location 22 to final terminal ditch location 23. Access ditch 21 may be 100 feet or so from intermediate ditch 22 which may be 100 feet or so from terminal ditch 23. Distances of less than 500 feet are preferred. A curvature of each spaced pipe is preferred (e.g., 70°-90°). The individual pipes may be spaced 2-10 feet apart at their midpoints. At the access, intermediate, and terminal ditch locations, the individual pipes may be plumed together so every other pipe carries fluid outbound and the other pipes carry fluid inbound.

While the network of pipes shown between 21 and 22 create a single mesh in a "hammock" structure, this innovation can be used to construct a set of hammocks at different depths.

Figure 3:
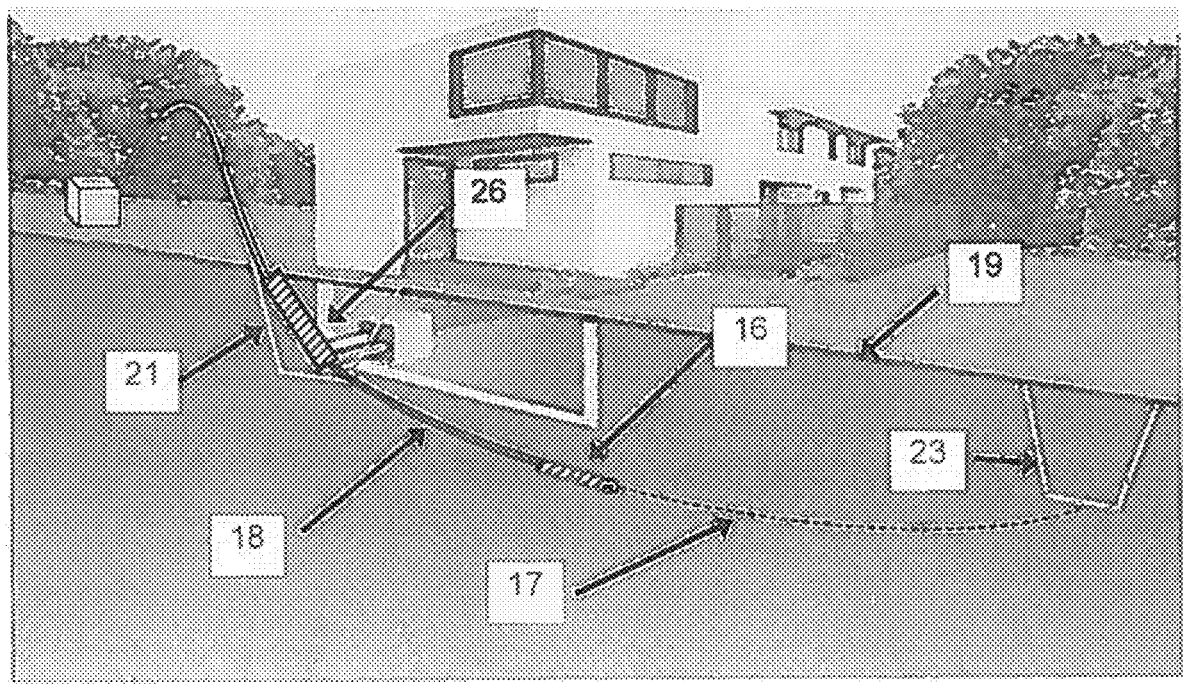
FIG. 3 is a schematic depth profile view showing the heat exchangers installation field and the planned path of a single pipeline as traversed by the piloted drill head and a casing from an access ditch to a terminal ditch.

As shown in FIG. 3, which shows a cross section of the subterranean below ground level 19, each heat exchanger pipe is deployed underground using a piloted drill head 16 removably connected to outer protective casing 18 (e.g., a coiled spring element or jointed pipe segments) which surrounds an umbilical also removably connected to the piloted drill head 16. The piloted drill head 16 drills a bore hole in the earth along the planned trajectory 17 from access ditch 21 to terminal ditch 23.

Figure 4A:
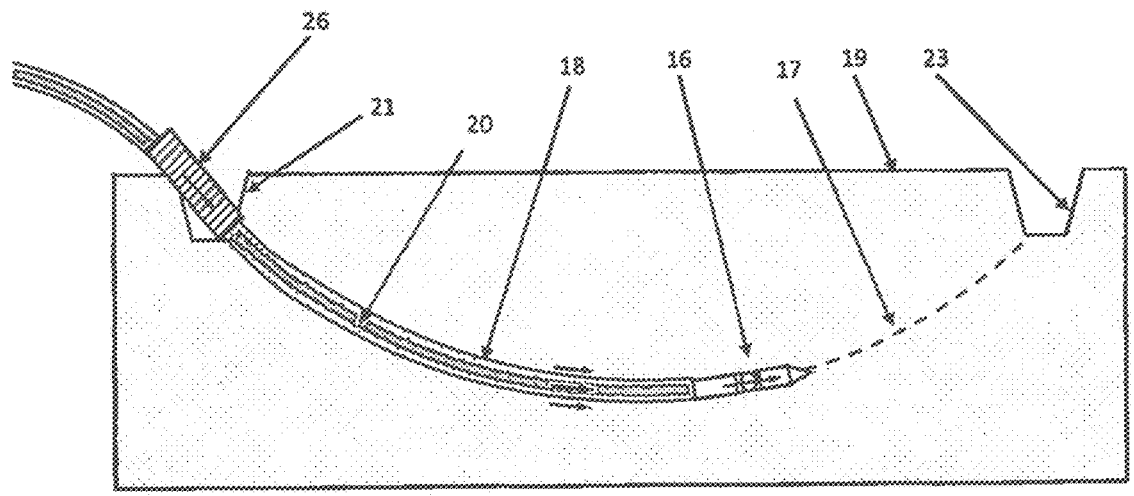
FIG. 4A schematic view of initial installation processes of deployment pipe (casing and umbilical) attached to a piloted drill head proceeding from the access ditch to the terminal ditch.
Figure 4B:
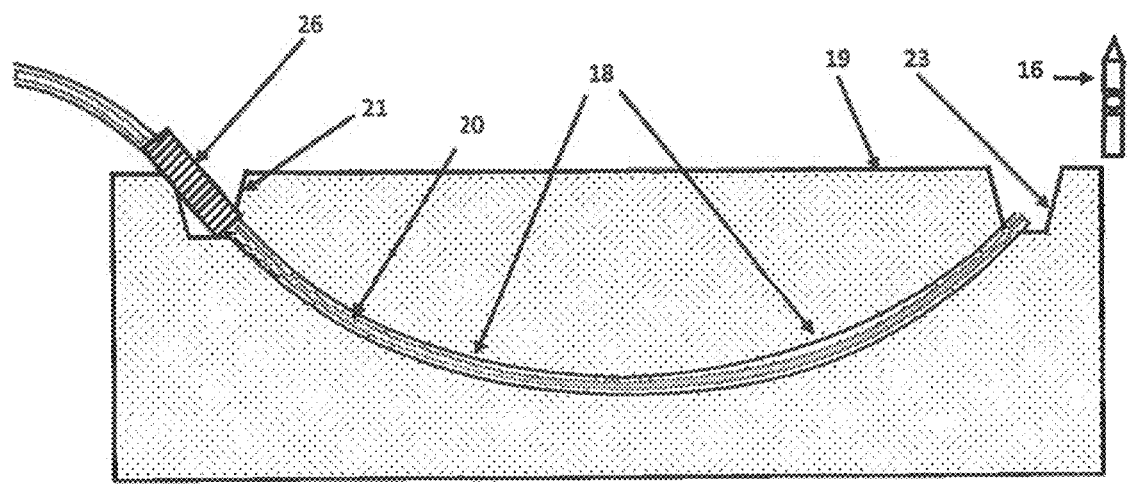
FIG. 4B is a schematic view of deployment pipe (casing and umbilical) installed with pilot drill head removed.
Figure 4C:
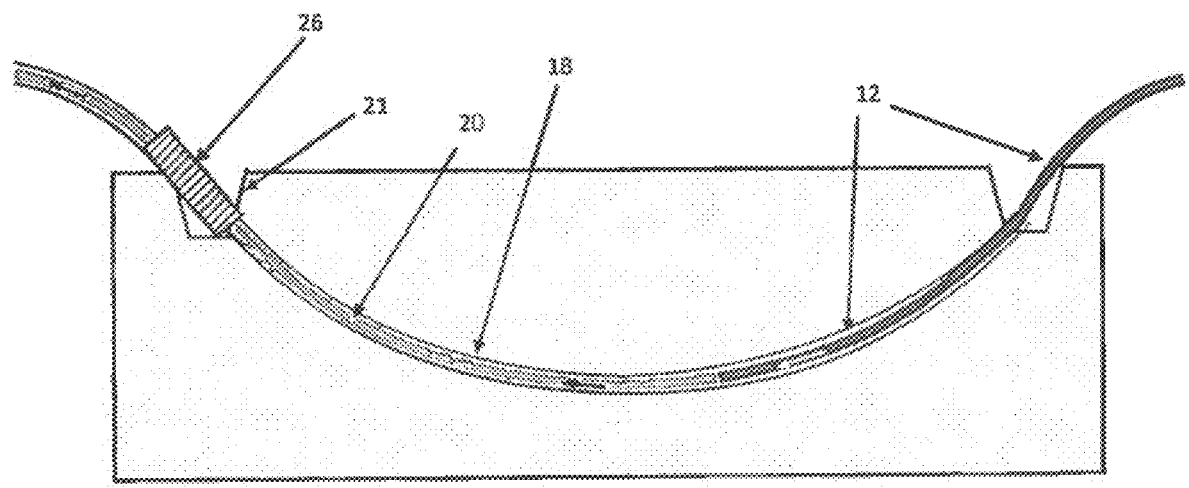
FIG. 4C is a schematic view of process of extracting umbilical which tows in heat exchanger pipe that has now been attached to the umbilical and is withdrawn from the access ditch deploying the heat exchanger pipe into the earth inside the protective outer casing.

In FIG. 4A, piloted drill head 16 is progressing from access ditch 21 to terminal ditch 23 underground and so too is casing 18 and umbilical 20. In FIG. 4B, the piloted drill head has reached terminal ditch 23 (a final terminal ditch or an intermediate terminal ditch) and the piloted drill head is disconnected from both the casing 18 and umbilical 20. In FIG. 4C, at the terminal ditch location 23, heat exchanger pipe 12 is connected to the distal end of umbilical 20. One component of the umbilical cord is a set of mechanically strong cables that run the length of this umbilical. This allows the umbilical to be pulled rearward out of access ditch 21 thus drawing heat exchanger pipe 12 into the casing 18.

Figure 4D:
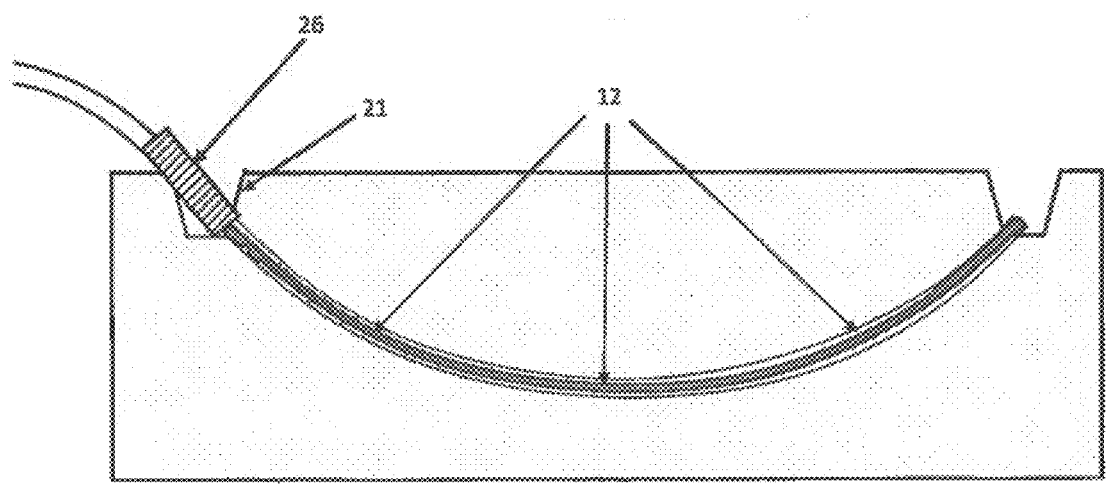
FIG. 4D is a schematic view showing the heat exchanger pipe nested in deployment pipe's casing now extending from the access ditch to the terminal ditch.

In this manner, casing 18 protects heat exchanger pipe 12 from damage as it is deployed into the bore hole. Umbilical 20 may be wound on a spool, for example, located proximate access ditch 21. Thus, both the piloted drill head and the umbilical are reusable. The heat exchanger pipe coupling mechanism may include a series of inflatable tube that are insert into some length, or the full length, of the heat exchanger pipe. These inflatable tubes would be connected together in a chain with axial cables which in turn are connected to the umbilical. In FIG. 4D pipe 12 has been pulled fully into casing 18 extending between access ditch 21 and terminal ditch 23.

Figure 4E:
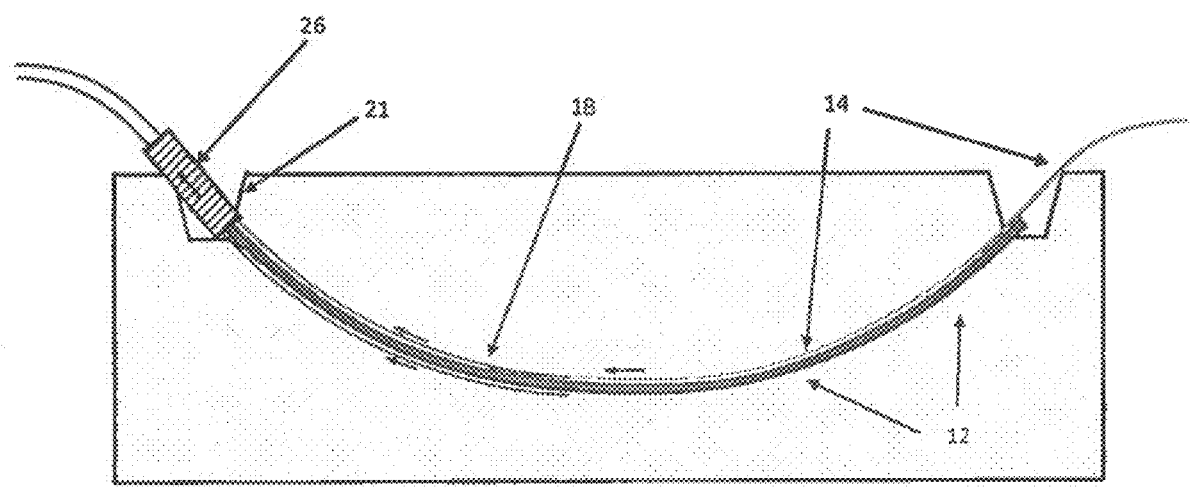
FIG. 4E is a schematic view showing the process of withdrawing the casing which is towing a grout pipeline into place along the side the heat exchanger pipe which is left in place.

In FIG. 4E, the casing 18 is being withdrawn from the bore hole and out of access ditch 21 leaving heat exchanger pipe 12 in the bore hole. In some embodiments, grout pipeline 14 is attached to the distal end of casing 18 at terminal ditch location 23 and is deployed into the bore hole adjacent the heat exchanger pipe 12 as casing 18 is withdrawn from the bore hole.

Figure 4F:
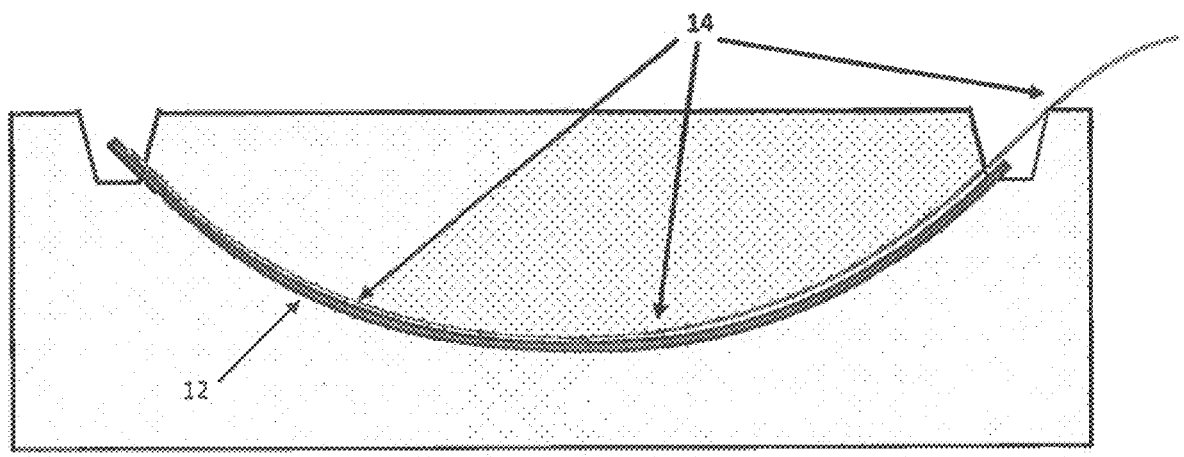
FIG. 4F is a schematic view of the grout pipeline adjacent to heat exchange pipe which is in place within the bore hole.

In FIG. 4F, shows how the option optional grout pipeline 14 lays adjacent to the heat exchanger pipe 12 in the bore hole.

Figure 4G:
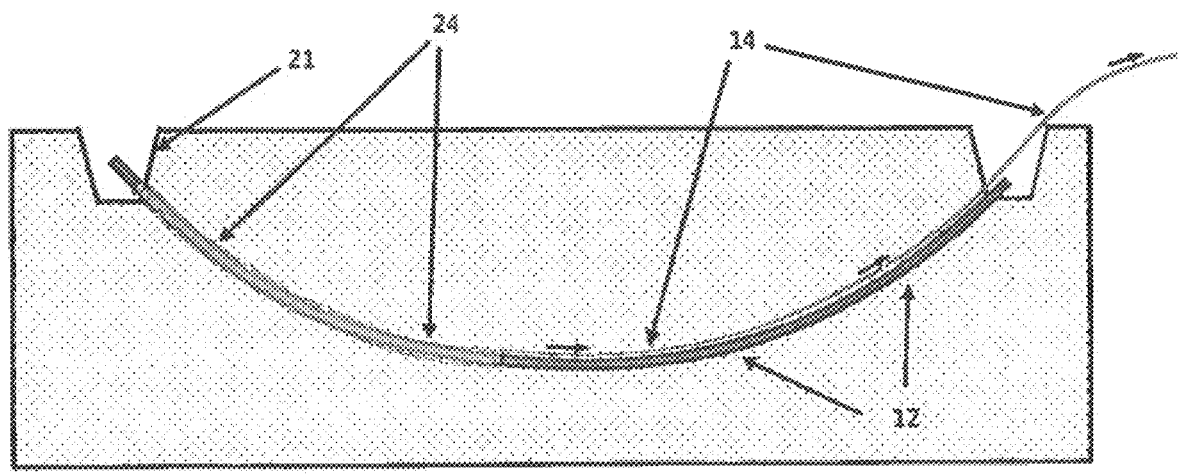
FIG. 4G is a schematic view of process of withdrawn the grout pipeline out of the terminal ditch while deploying a stream of grout about the heat exchanger pipe within the bore hole.

In FIG. 4G, shows how the option optional grout pipeline 14 can then withdrawn out of the bore hole via the terminal ditch 23 while grout 24 is pumped into the bore hole about the heat exchanger pipe 12 via the grout pipeline 14 to ensure a good thermal contact between heat exchanger pipe 12 and the earth. In an alternative embodiment the protective casing will include an integrated grouting tube that is used to deploy grout as the casing is removed. This may be either the deployment pipeline's casing or the alternative a protective sheath described that first appears in FIG. 4H.

In some circumstances the heat exchanger pipe could be optionally drawn through the bore hole unprotected. In these circumstances both the casing and the umbilical cord would be extracted together towing the heat exchanger pipe and optionally the grout pipeline simultaneously. When employing this strategy the steps shown in FIG. 4E would be skipped.

Figure 4H:
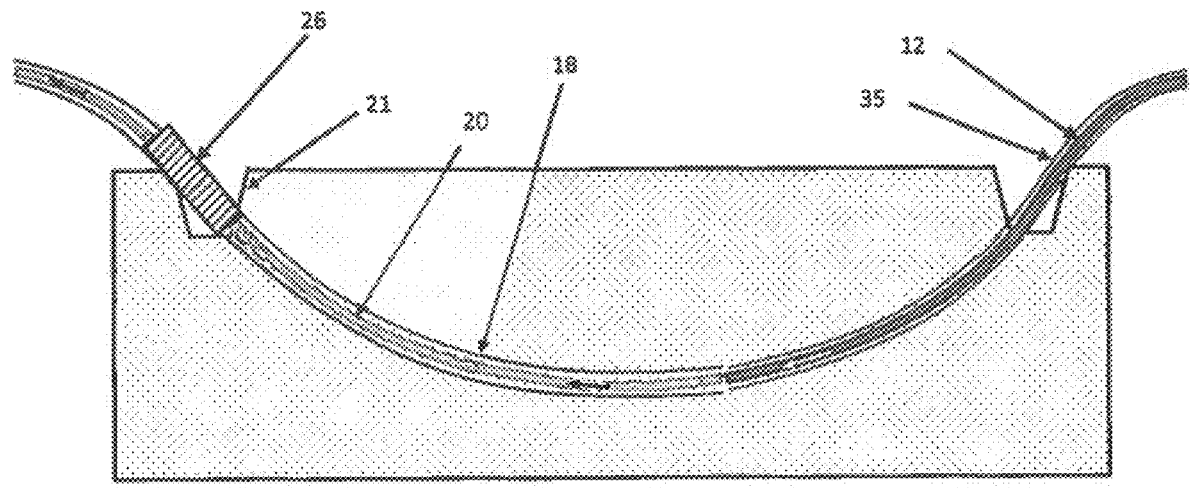
FIG. 4H is a schematic view of an alternative process.

In FIG. 4H another alternative is shown where both the umbilical 20 and the casing 18 are removed from the bore hole together while they jointly tow the heat exchanger pipeline 12 which has already been nested within a protective sheath 35, into the bore hole. This protective sheath would be removed in the next step as shown in FIG. 4E described earlier.

Figure 5:
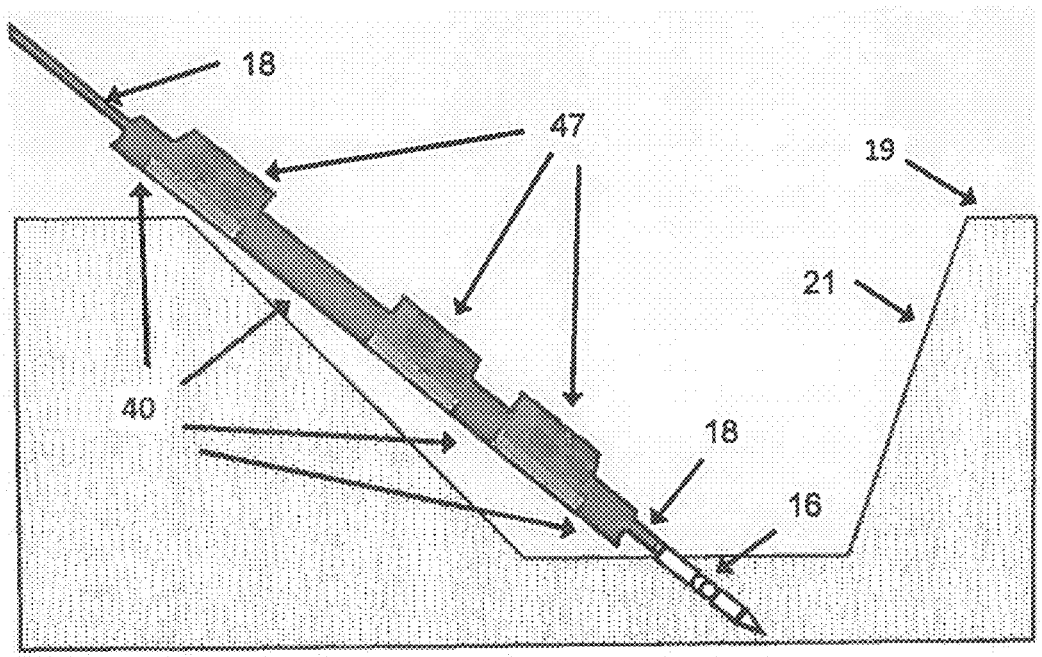
FIG. 5 is a schematic view showing one design of a casing driver which employing trolley drivers running on a linear track.

FIG. 5 show a preferred piloted drill head 16 which includes one or more drill bits powered by electric motors, pneumatics, or hydraulics, but other drill heads may be used including percussion drivers. Preferably, the piloted drill head is pushed from the access ditch location to the final ditch location by a pushing force imparted to the casing by a casing driver as is deployed at proximate access ditch 21. In one example embodiment this is composed of a trolley drive track, which in this example, hosts three drive trolleys 47 driving the casing 18 and piloted drill head 16 into the ground. The piloted drill head creates a bore hole as it moves forward.

Figure 6:
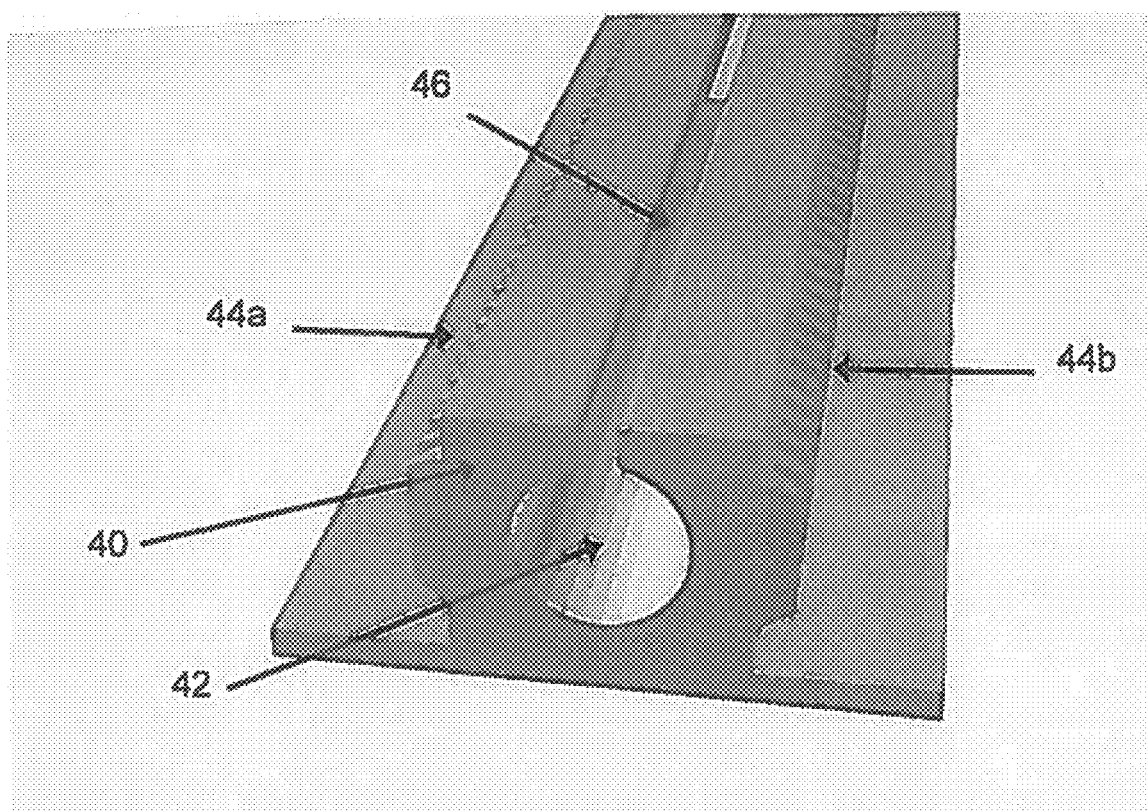
FIG. 6 is a schematic view showing an example of a casing driver track.
Figure 7:
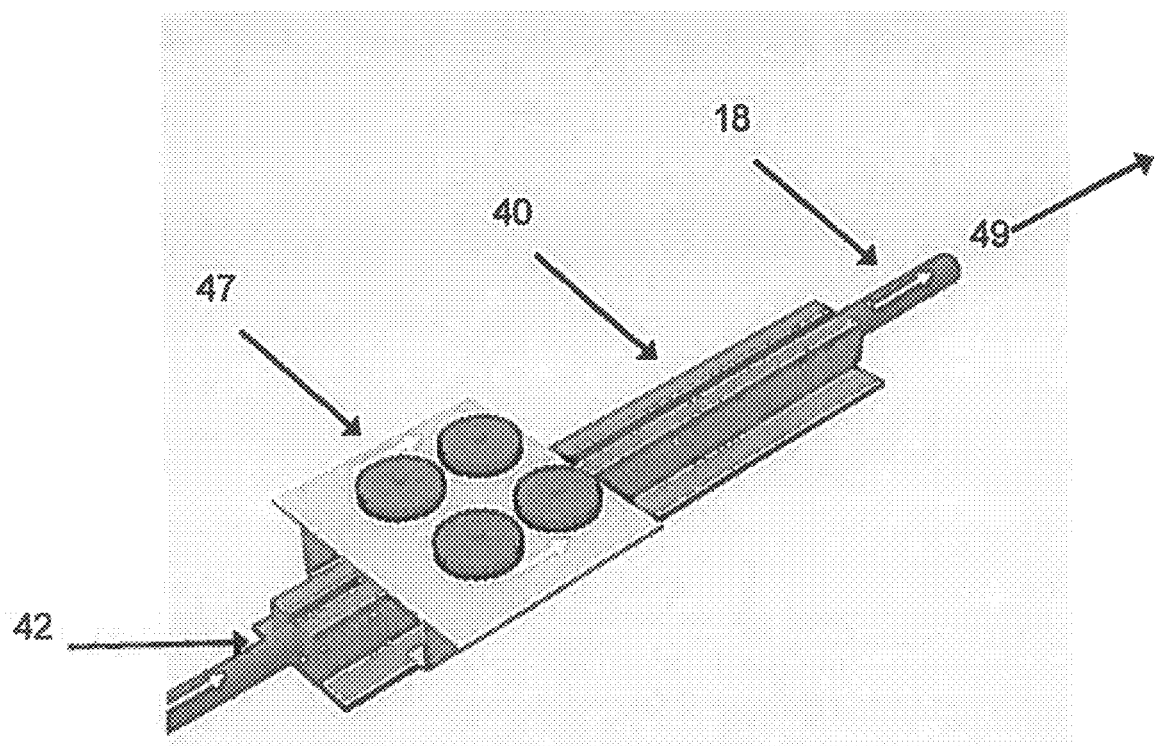
FIG. 7 is a schematic view showing an example casing driver employs one or more trolley moving along a track and urging the casing forward.
Figure 8:
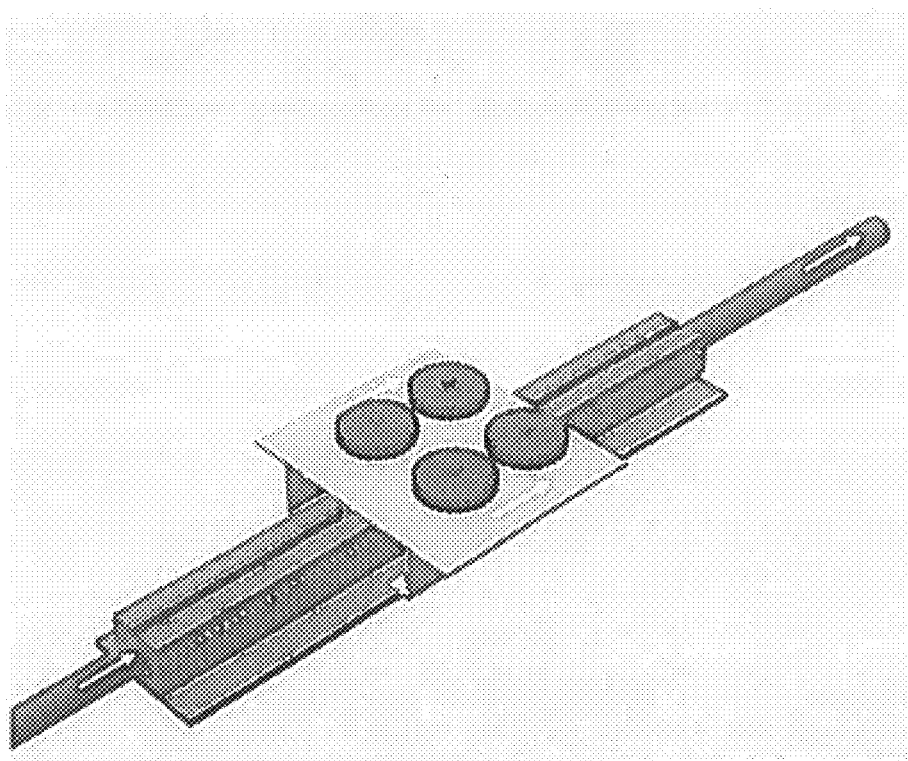
FIG. 8 is a schematic view similar to FIG. 7 showing the trolley advancing on the track and pushing the casing forward.

In one embodiment, the drive subsystem includes a rail 40, FIG. 6 to be located proximate an access ditch location. Rail 40 includes inner tunnel 42 between opposing side linear gear racks 44a and 44b. There is an access channel 46 in the top of rail 40 extending into tunnel 42. As shown in FIGS. 7 and 8, trolley 47 moves along rail 40 and is configured to urge the casing 18 forward as shown by arrow 49 in the direction of a terminal ditch location. Casing 18 resides in rail tunnel 42.

Figure 9:
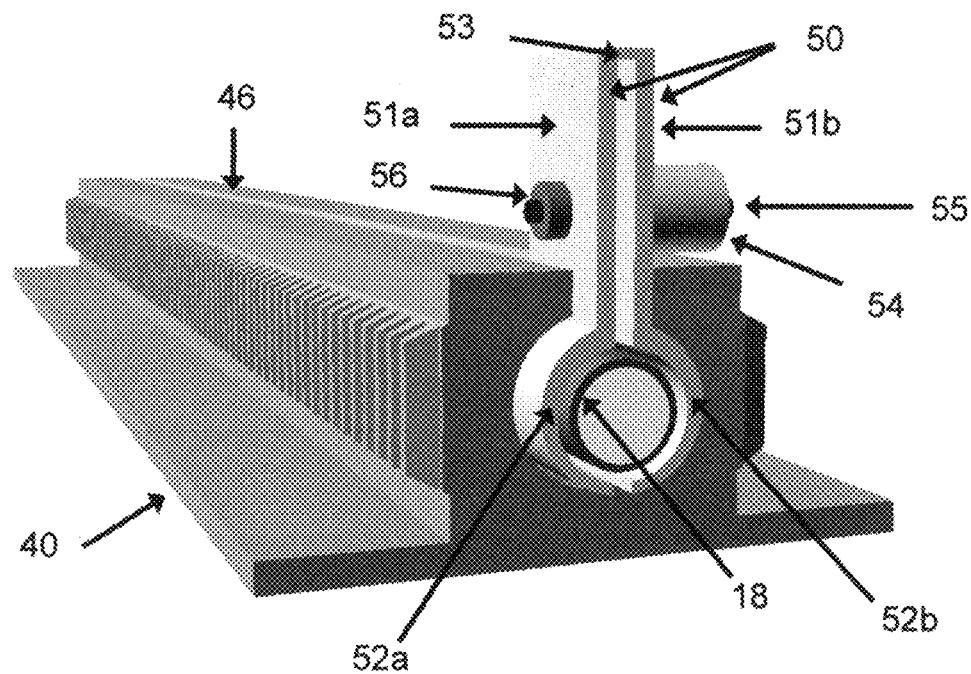
FIG. 9 is a schematic view showing grasper mechanism associated with the trolley of FIGS. 7-8.

FIG. 9 is a rendering of grasping clamp 50 used by the trolley to engage the casing. This grasping clamp is normally hidden inside the tracks tunnel beneath the trolley. Each trolley includes one or more grasping clamps 50, which arms extending through access channel 46 into the rail tunnel in order to releasably grasp the casing that residing in the rail tunnel and to urge the casing forward as the trolley moves forward along the rail. Grasping clamp 50 may include clamp arms 51a and 51b connected at common pivot 53 and including concave sections 52a, 52b which are disposed inside track tunnel 42 about the outside of the casing 18. Various means may be used to bias grasping clamp arms 52a, 52b into engagement with the outside of casing 18 such as linearly driven screw 55 fixed to clamp arm member 51b and extending through a threaded hole in clamp member 51b and connected to pressure bearing 56 attached to clamp member 51a. The motor 54 drives screw 55 in one direction to drive the clamp member concave sections 52a, 52b towards each other and drives screw 55 in the opposite direction to release the clamp member concave sections from the casing.

Figure 10:
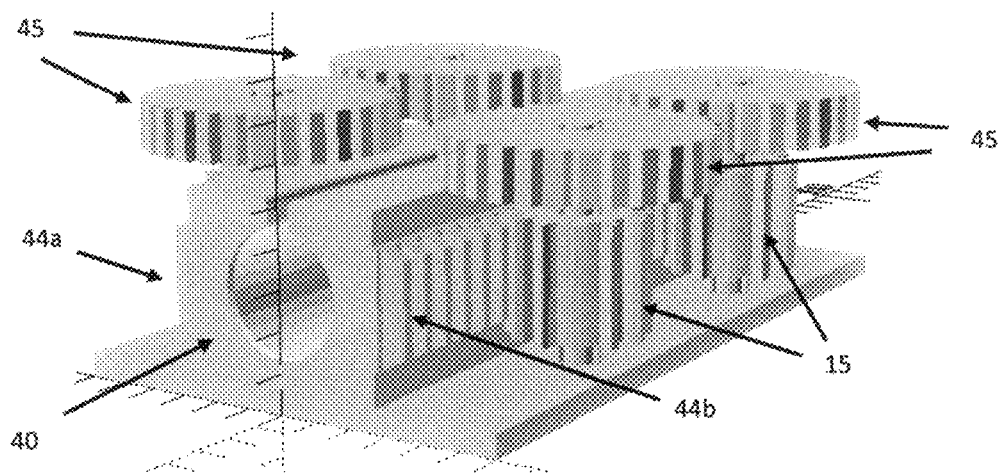
FIG. 10 is a schematic view showing the drive gears of the trolley shown in FIGS. 7 and 8.

Various mechanisms may be provided to move the trolley linearly along the rail and FIG. 10 illustrates how motors (not shown) would turn the (4) drive gears 45 which turn the (4) pinion 15 which in turn engage the drive rail linear gears 44a and 44b that appear on opposite side of the drive rail 40. Once the trolley approaches the end of the rail 40 as shown in FIG. 5, the grasper of the trolley releases the casing and the trolley maneuvers rearward along the rail to a starting position assigned to that trolley whereupon it again grasps the casing and urges it forward. As shown in FIG. 10 there may be a plurality of driven pinion gears engaging the side gear racks of the rail and indeed there may be a plurality of trolleys working and maneuvering about a given rail at any one time as shown in FIG. 5 so that, for example, a first trolley moves forward while urging the casing forward at the same time a second trolley is maneuvering rearward toward its starting position to grasp the casing before the first trolley has released it. Each trolley may include multiple pinion gears engaging the rail side gear racks as shown in FIG. 10 and multiple motors driving the pinion gears via one or more additional gears.

The trolleys are preferably driven by self-contained motors that turn drive gears that engage the linear gears that run on opposing side of the track. By selectively grabbing the pipeline when traveling toward the access ditch and releasing the pipeline when traveling away from the access ditch, each trolley provides a drive force to the deployment pipeline forward toward the terminal ditch. By employing two or more trolleys on the same drive track, the drive control system can ensure that one or more trolleys are always driving the deployment pipeline in the desired direction. This enables the drive system to collectively provide a continuous drive force.

Figure 11A:
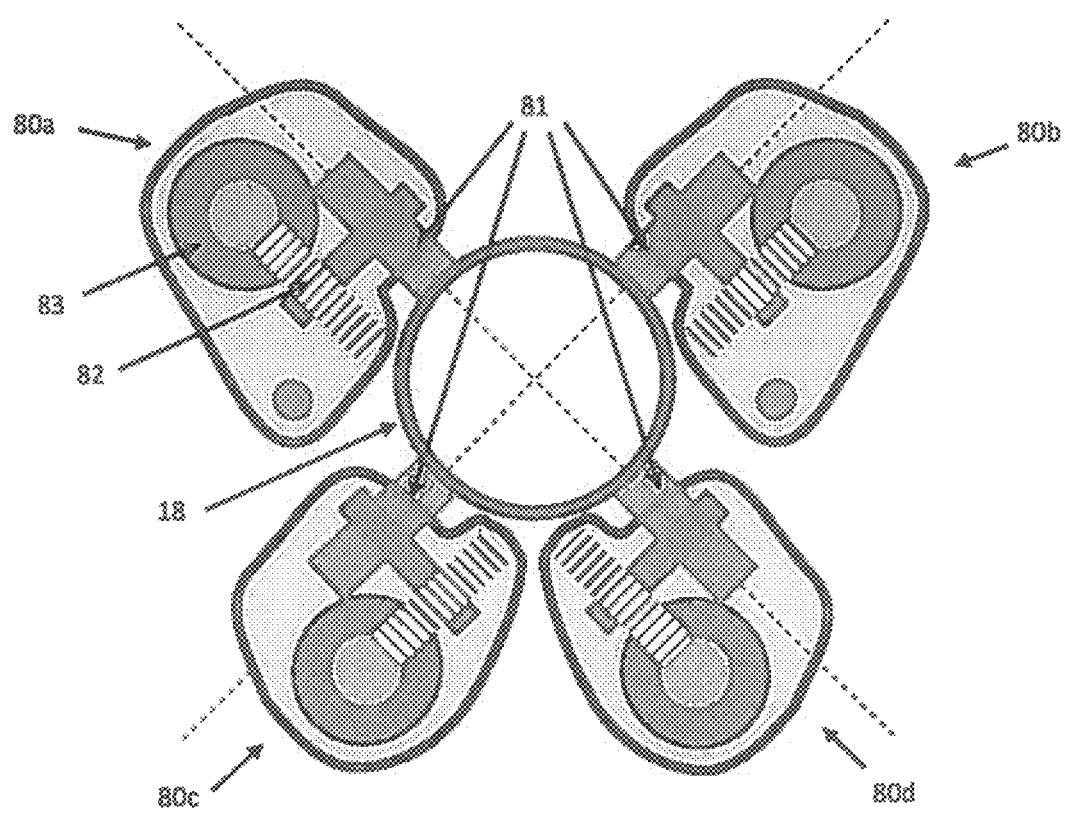
FIG. 11A is a schematic view of an alternative casing driver which employs roller drivers to urge the casing forward, that are shown engaging the casing.

FIG. 11A shows a schematic view of an alternative drive mechanism employing (4) roller drivers 80a, 80b, 80c and 80d, each of which includes a drive wheel 81 and are positions to surround the casing 18. These drive wheels are forced towards the center of the casing effectively squeezing against the casing thus increasing the fiction between each drive wheel and the casing's exterior. In this illustrative example a set of four roller drivers surround the casing each separated by 90 degrees, but many alternative configurations could be designed to create a working roller drive set. A casing driver subsystem would likely be composed of a number roller drive sets distributed along a length of the deployment pipeline.

Figure 11B:
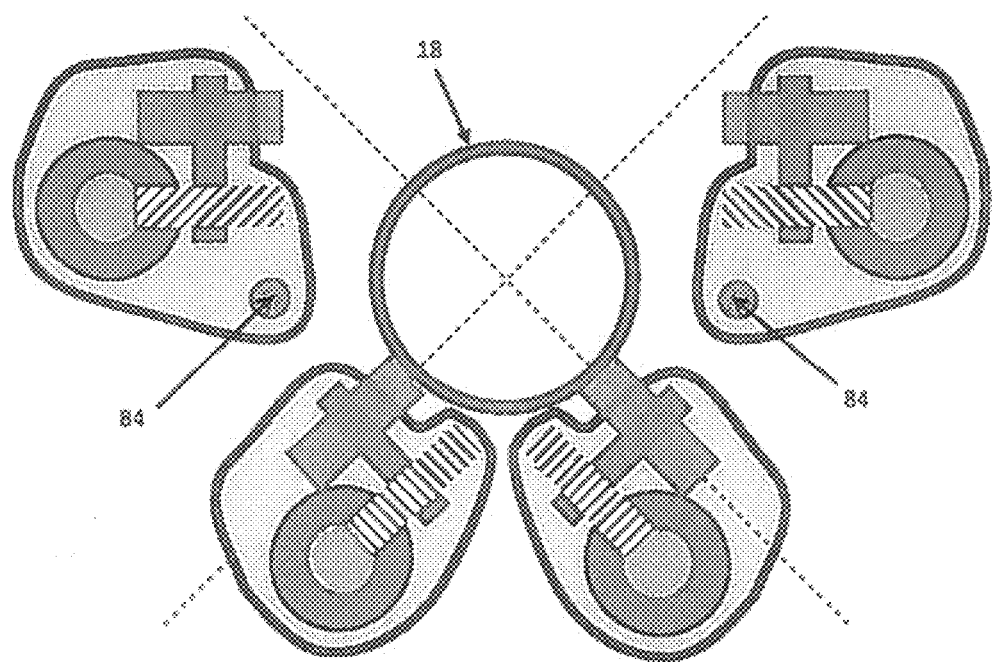
FIG. 11B is a schematic view of an alternative casing driver which employs roller drivers to urge the casing forward, that are shown the drivers disengaging from the casing

FIG. 11B shows how two of the roller drivers could be rotated around pivot 84 thus releasing the casing and allowing its removal or insertion in the casing driver.

Figure 12:
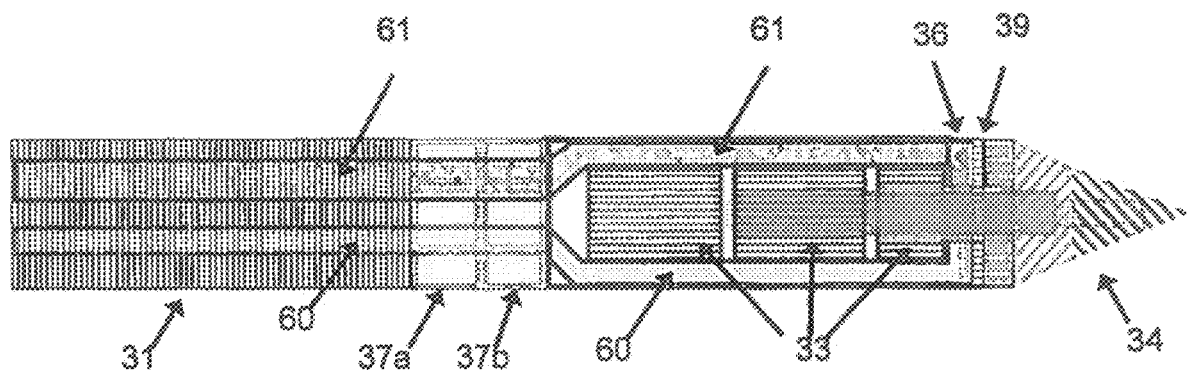
FIG. 12 is a schematic view showing an example of the casing attached to one or more steerable joints themselves attached to the drill head.

FIG. 12 is a schematic showing the shows the major components of the piloted drill head. Section 31 contains the (4) joint drivers that control the steerable joints 37a and 37b. In this example each joint is steerable in one axis and the two joints are configured to operate at 90 degrees relative to each other. A stream of clean water passes through a conduit 60 from the umbilical though both the steering driver section and the drill motor assembly 33 to the cutting chamber 36 where cuttings from the drill bits 34 are forced through the grinding plate 39 and mix with the stream of clean water. The mixture of cuttings and water travel through the evacuation pipeline 61 back past the drill motors 33, past the steerable joint drivers 31 and finally back into the umbilical.

Figure 13:
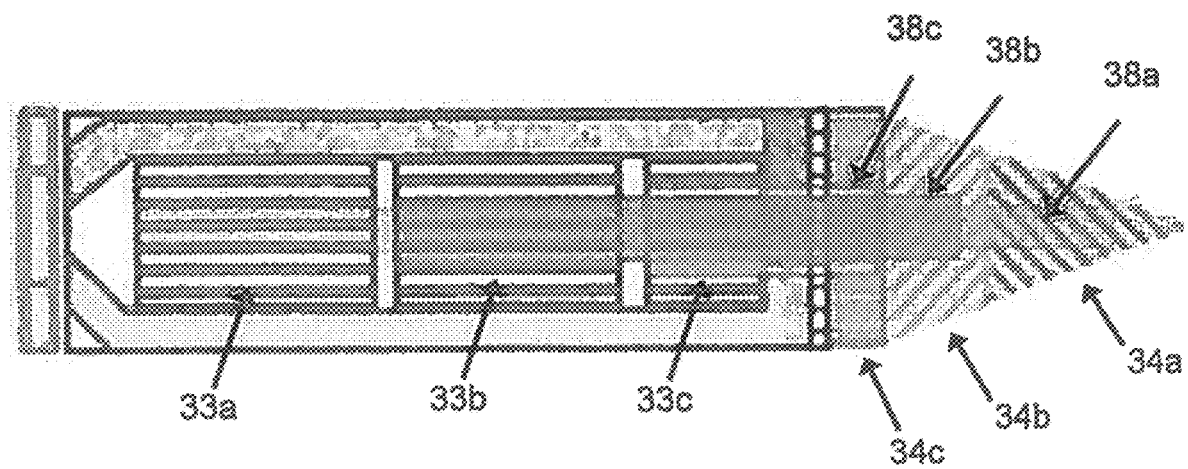
FIG. 13 is a schematic view showing the primary components associated with a preferred piloted drill head, including counter rotating drill bits.

The detailed design of the piloted drill head shown in FIG. 13 is optimized for the composition of the earth at the installation site. The top (upper 15 feet) of the earth is commonly composed of mixtures of sand, clay and loam. Deeper layers of the earth are more commonly composed of more solid rock. In the primary embodiment, the drilling head shown in FIG. 13 is designed to be driven with minimized rotation. As such the drill is designed to produce minimum torsional force to the deployment pipeline that is driving it forward. One novel mechanism designed to minimizing the torsional forces is to employ a pair of counter rotating cutting bits 34a and 34b that are proportioned to remove the same volume of earth. As such the torsional forces produced by the two cutting bits will approximately cancel each other. The design shown in FIG. 13 includes a third cutting bit 34c that can cut in either direction. If, at any moment during the drilling process, the torque of the first two cutting bits cancel each other than this third bit would simply oscillate (thus producing a torque neutral average). However, if the control system recognizes a residual torque from the first two cutting bits the third cutting bit's oscillation could be biased to compensate for the difference between the first two. In this instantiation the cutting bits are driven by independent motors 33a, 33b, 33c, which are connected to the drill bits by concentric drive shafts 38a, 38b, 38c. The two counter rotating drill bits could share a common motor and use a gear train to create the counter-rotation.

An alternative implementation uses just one cutting bit designed for bidirectional operation. In this model this one bit's oscillation would be biased to maintain a torque neutral average.

Figure 14A:
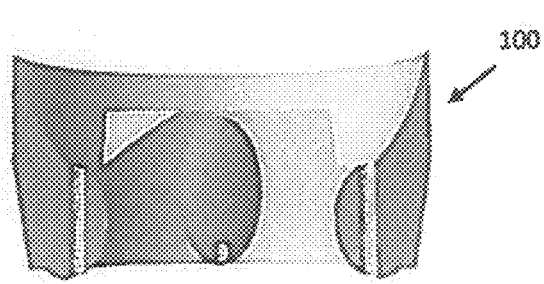
FIGS. 14A-14B are schematic views of the articulated joints that represent one strategy for building a steerable joint that supports a drive force.
Figure 14B:
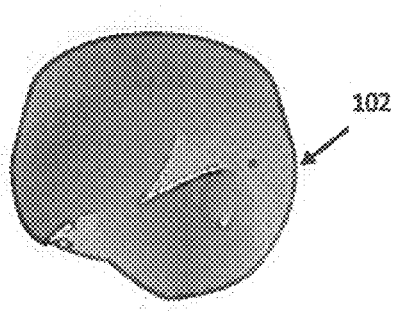

The three-dimensional position of the piloted drill head may be monitored during the drilling progress. The steerable joints, shown as 37a and 37b in FIG. 12 are integrated into the piloted drill head just behind the drill motors 33. These steerable joints allow the control system to tilt the piloted drill head to direct the piloted drill head along the desired pipeline path. One embodiment of these steerable joints which shows the cross section of a hollow cup 100, FIG. 14A and the mating ball 102, FIG. 14B. These steerable joints are designed to transmit the drive force that propels the drive head forward, yet selectively control the axial angle between the deployment pipeline's casing and the piloted drill head. The typical deflection angle is about 1 degree, in that the nominal curvature of a pipe in a heat exchanger would typically be less that 90 degrees over 90 feet and the drill head is approximately 1 foot in length. While one embodiment may be designed to achieve a 5-degree deflection, in normal operation it would be called upon to operate between plus and minus 2.0 degrees. Cables extend through cup 100 and one connects to ball 102 while other cables connect to the next cup in the downstream steerable joint.

The design shows a radial ball and cup which provides a mated drive cross section that is roughly the area of the deployment pipeline's outer shell. This design also provides a grit resistant coupling. Control cables that articulate the steerable joints are driven by linear drivers. These drivers can be distributed over the length of the control segment of the piloted drill head. This design has the desirable feature that only a single steering joint driver appears in any one cross section of the steering control segment. This allowing more of the cross section of the joints to be occupied by other components such as passages for the water supply and the evacuation channel.

Figure 15A:
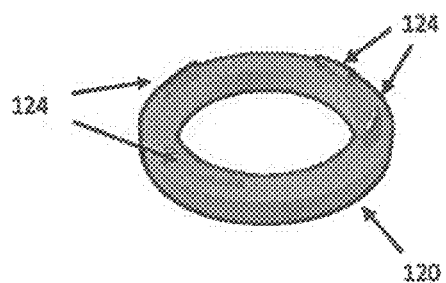
FIGS. 15A-15B are schematic views of one alternative mechanical linkage between the casing and piloted drill head.

The piloted drill head assembly is connected to deployment pipeline's two major components, the casing and the umbilical, through a mechanism that allows it to be readily detached from the deployment pipeline in the field as part of the normal heat exchanger pipe installation process. The outer casing may be mechanically connected to the piloted drill head with a series of semi-circular keyed tangs. Four tangs intentional arrayed in a non-uniform pattern to force a specific alignment can be used. Coupling 120, FIG. 15A, for example, is connected to the end of the protective casing and coupling 122 is connected to the drill head (or a steerable linkage) to rapidly connect and disconnect the drill head from the outer casing. Tangs 124 of coupling 120 interlock in slots 126 of coupling 122. Similar coupling arrangements may be used between the umbilical and the heat exchanger pipe and/or between the components of the umbilical and the drill head. Other coupling arrangements are possible.

Figure 15B:
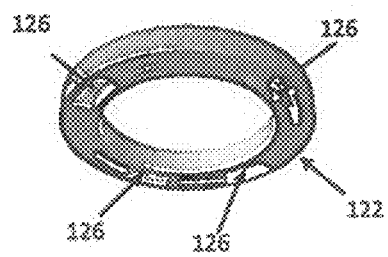
Figure 16:
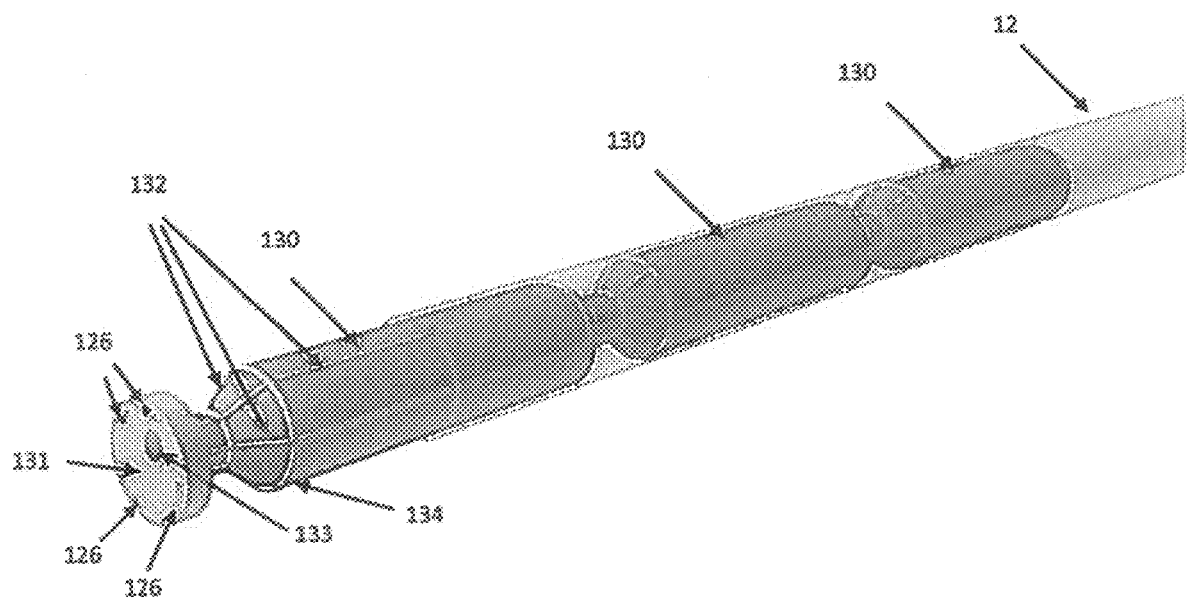
FIG. 16 is a schematic view showing the inflatable towing insert that connects the heat exchanger pipe to the umbilical cord such that the umbilical can be used to pull the heat exchanger pipe through the casing or alternatively directly through the bore hole.

The heat exchanger pipe coupling mechanism to the umbilical may include a series of inflatable tubes 130, FIG. 16 that are insert into some length, or the full length, of the heat exchanger pipe 12. Tubes 130 may be inflated via the umbilical water or gas supply. These inflatable tubes would be connected together in a chain with axial cables 132 which in turn are connected to the umbilical via a coupling mechanism 131 that in this example has four mechanical tang holes 126 that can be mated tangs as that shown in FIGS. 15A and 15B. In this example the water supply pipe of the umbilical is connected to the inflatable tubes via port 133.

In some circumstances, the heat exchanger pipe could be optionally drawn through the bore hole unprotected. In these circumstances both the casing and the umbilical cord would be extracted together towing the heat exchanger pipe and optionally the group pipeline simultaneously. When employing this strategy, the steps shown in FIG. 4E would be skipped.

Figure 17:
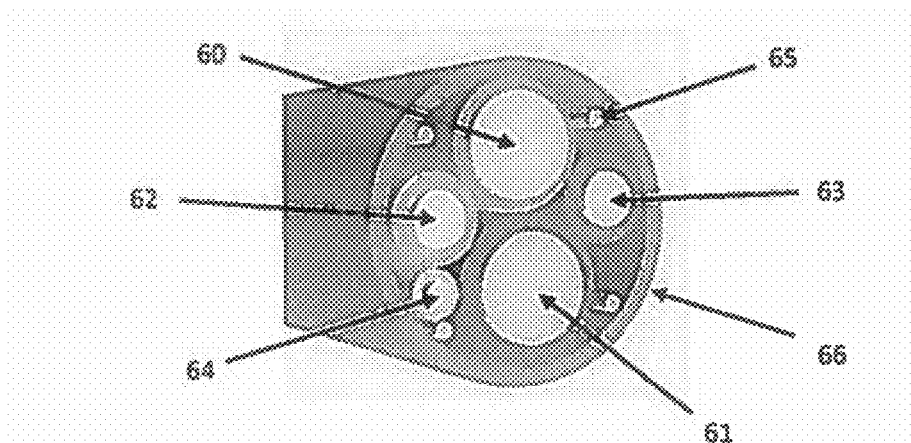
FIG. 17 is a schematic cross section view of umbilical supply cable showing some of the components thereof.

The umbilical cord may be connected independently and mates the various components of the supply cable such as water passages electrical power, and communication wires. A schematic cross section of the umbilical cord is show in FIG. 17. The umbilical supply cord provides a water supply 60, an evacuation channel for removal of cutting water and cuttings 61, power for control electronics 62 and 63 and drill motors, communication lines 64 that connect the on-board electronics to the remote navigational control computers, and, optionally, pressurized air, and any other commodity needed by the piloted drill driver. The umbilical cord is reinforcing with steel cables 65 indicates 1 of 4 that provides tensile strength required when the umbilical is pulled into the deployment casing and when it is used as a tether to pull the heat exchanger pipeline into place.

The navigation system may provide a series of estimates of the current location of the piloted drill head during the drilling process. This could be achieved using existing art such as RF or magnetic directional detectors or range finders. These existing solutions could be employed but are relatively expensive.

Figure 18:
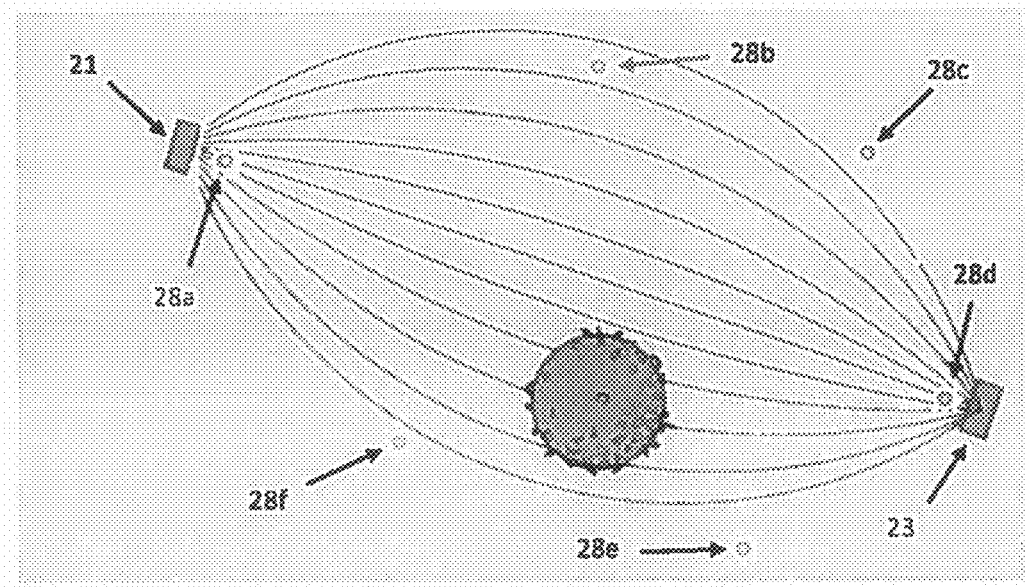
FIG. 18 is a schematic view showing a drill head navigation method.

Using inground acoustic transmission for triangulation is generally thought to be unreliable given the propagation time of acoustic waves varies depending on the nature of the soil. However, in this application absolute accuracy can be made non-critical given that the design goal of the deployment field is to create an underground pipeline mesh that has a desired relative spacing between pipelines. Further, as shown in FIG. 18, by employing low cost hydrophones a system can employ several hydrophones 28a, 28b, 28c, 28d, 28e 28f deployed at a number of locations around the heat exchanger deployment field. These would benefit from locating one at both the access ditch and the terminal ditch. In this way measured propagation times can be used to center the possibly distorted 3D map of acoustic location such that they distorted measure map and the known absolute maps are aligned at the two critical points: 1) where the heat exchanger pipes enter the earth and 2) where they emerge. Subtle strategies improve the overall conformance to the design goals of distributing the pipelines with large separations. On strategy is to deploy the central pipeline first. Then the paths of the subsequent pipelines can be designed relative to each subsequent path and as such will have error terms that only reflect the local distortions, given that the acoustic distance measurement were made over the extent of this pipeline. Other known factors contribute to the accuracy of the computed position. One added value is the known length of the portion of the casing that has been pushed forward at any one moment.

The resulting system provides protection for relatively fragile pipeline material and may be optimized for relatively tight turning radius of 90 degrees in 90 feet compared to 70 degrees in 1000 feet for conventional direction drill.

The system may be optimized for very small bore-hole 1.5". This minimizes driving force and volume of earth removed and volume of grout needed to reestablish pipe to ground thermal connection. The system may be optimized for the soil common in top 15' depth of earth. When conventional well drilling equipment is used in soil it requires an inserted casing to keep the earth surrounding the bore hole from eroding into the stream of water flushes the bore hole. Containing this stream of water and cuttings is the motivation for incorporating an evacuation channel in the umbilical. This strategy supports relatively dry installations. Note the supply water may be used as a drilling fluid to reduce shearing force, and to cool and lubricate the drill motors and drill bits. The compact casing driver can be deployed in a small ditch (6 feet by 6 feet) very close to the building served by the heat exchanger. The site may be optimized for relatively short runs of 120 feet rather than 500 to 1000 feet capacity of vertical or horizontal directional drills. A near surface (6 feet starting depth) to near surface (6 foot ending depth) is preferred. Acoustic navigation with multiple low-cost transponders may be used.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A heat exchanger pipe installation system comprising: a piloted drill head; an umbilical removably connected to the piloted drill head; a casing removably connected to the piloted drill head about the umbilical; and the umbilical including an attachment mechanism for removably connecting a heat exchanger pipe to the umbilical.

2. The system of claim 1 further including a drive subsystem for the casing.

3. The system of claim 2 in which the drive subsystem includes:
   a casing drive rail located proximate an access ditch; and
   at least one trolley moving along said rail and configured to urge said casing towards a terminal ditch location.

4. The system of claim 3 in which said rail includes a tunnel for the casing.

5. The system of claim 4 in which said rail further includes an access channel into said tunnel.

6. The system of claim 5 in which said trolley includes a grasping device extending into the tunnel through the access channel.

7. The system of claim 6 in which the grasping device is configured to releasably grasp the casing in the tunnel.

8. The system of claim 3 in which the rail includes at least one gear rack and the trolley includes at least one motorized pinion engaging the gear rack.

9. The system of claim 8 in which the rail includes a pair of opposing side gear racks and the trolley includes at least one motorized pinion for each side gear rack.

10. The system of claim 9 further including one or more motors driving said pinions via a gear train.

* * * * *